United States Patent [19]

Kurtz, Sr. et al.

[11] 3,723,975

[45] Mar. 27, 1973

[54] OVERDUE EVENT DETECTOR

[75] Inventors: Hobart L. Kurtz, Jr., Wappingers Falls; Glenn H. Smith, Hyde Park; Charles H. Wolff, Poughkeepsie, all of N.Y.

[73] Assignee: International Business Machines Corporation, Armonk, N.Y.

[22] Filed: June 28, 1971

[21] Appl. No.: 157,134

[52] U.S. Cl. .......... 340/172.5

[51] Int. Cl. .......... G06f 9/00, G06f 11/04

[58] Field of Search .......... 340/172.5

[56] References Cited

UNITED STATES PATENTS

| | | | |
|---|---|---|---|
| 3,566,368 | 2/1971 | DeBlauw | 340/172.5 |
| 3,618,042 | 11/1971 | Miki et al. | 340/172.5 |
| 3,518,633 | 6/1970 | Croy | 340/172.5 |
| 3,408,629 | 10/1968 | Haselwood | 340/172.5 |
| 3,312,951 | 4/1967 | Hertz | 340/172.5 |

*Primary Examiner*—Gareth D. Shaw
*Attorney*—Charles E. Rohrer

[57] ABSTRACT

An event detector for providing signals to general purpose digital computer hardware and/or software when excessive time passes prior to event occurrence. The detector includes storage means to record pluralities of sensitive events together with a time by which the event must be completed and clocking and comparator means to calculate target times and detect overruns.

6 Claims, 9 Drawing Figures

INVENTORS
HOBART L KURTZ JR
GLENN H SMITH
CHARLES H WOLFF

BY Chas. D. Cohen
ATTORNEY

Patented March 27, 1973 3,723,975

8 Sheets-Sheet 8

OVERDUE EVENT DETECTOR

This invention relates to the provision of means for isolating overdue events in a general purpose digital computer.

BACKGROUND OF THE INVENTION

Several needs have arisen for timing events and isolating overdue events in the operation of computing equipment and various devices have been built in response. For example, System/360 incorporates an interval timer via software for use by programmers, a typical use being the insertion of a particular time length into the interval timer at a location in the program when it is desired to guard against the possibility of "infinite looping." The result is to exit to an ending routine if the time expires prior to completion of the loop. Additionally, for example, hardware timers have been devised for particular purposes such as timing the period of use for each customer in a time-sharing system; or for preventing system tie-up while waiting on a particular input operation.

It is the general object of this invention to provide a general purpose hardware event detector which can be simultaneously utilized by main frame and server hardware devices to monitor performance and simultaneously to provide a detector for use by both system and user programs.

A detector of the type herein described eliminates software overhead connected with software interval timers and extends functional capability far beyond those presently existant in both software and hardware devices.

SUMMARY OF THE INVENTION

Basically, this invention provides a device external to main frame equipment incorporating a storage media on which events and corresponding completion times can be logged in great number together with means for periodically reviewing each event to discover those which are overdue. Means are provided within the device for calculating completion times and for cancelling events on the storage media when the event has occurred prior to becoming overdue. Other features, inventive aspects, objects and advantages will be apparent from the following more particular description of a preferred embodiment illustrated in the accompanying drawings.

DETAILED DESCRIPTION

Figure 1:
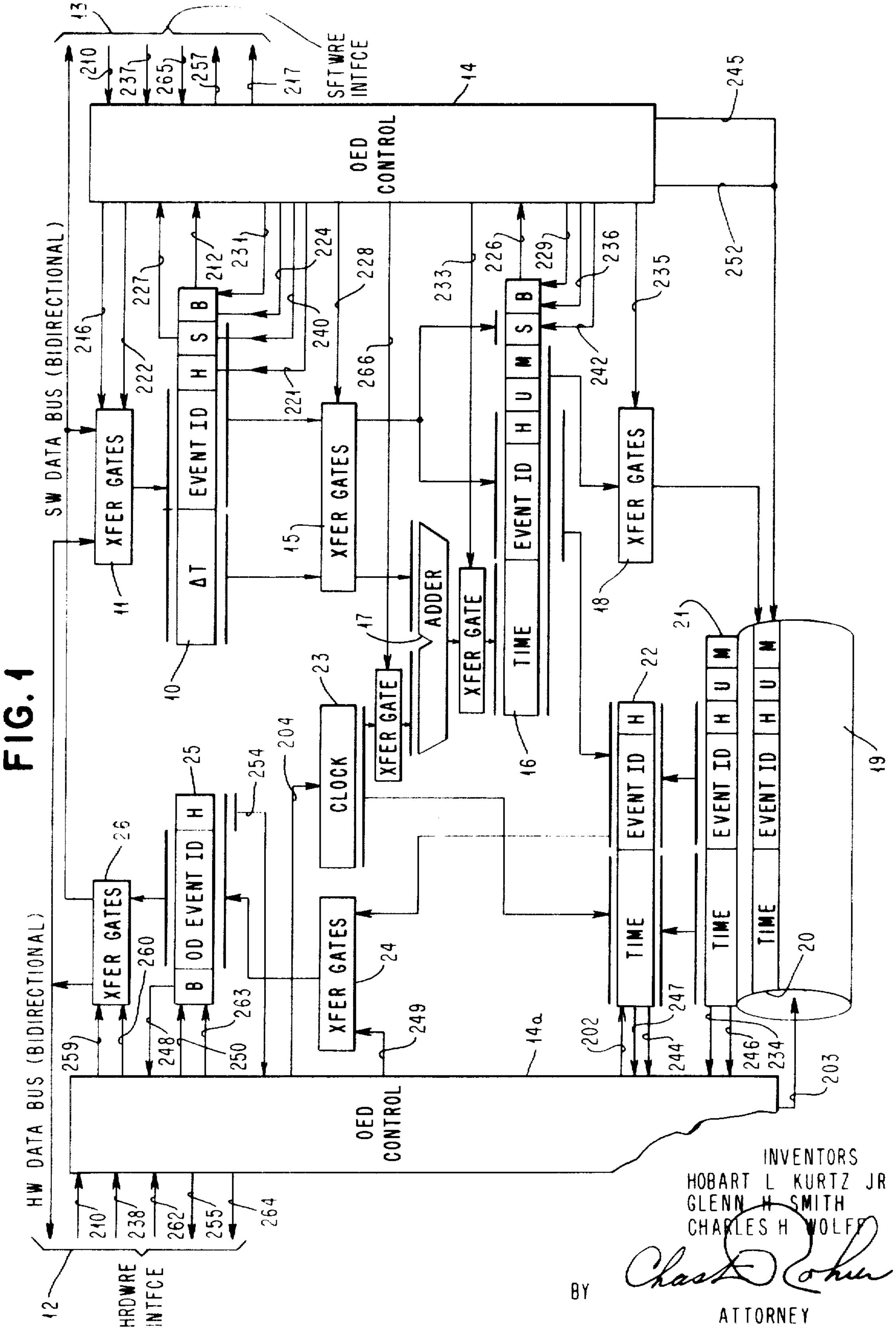
FIG. 1 shows the layout of all equipment and interconnections employed in a preferred embodiment of the device.

The preferred embodiment shown in FIG. 1 provides as a storage media an array of field effect transistors which can be visualized as a magnetic drum with several rows or slots of space available for storing data. The "FET drum" may be visualized as having a read station where information on the drum is viewed and a write station at which data is written onto the drum. Successive slots of information may be brought under the read and write stations as by stepping the drum periodically. The FET drum itself does not form a part of this invention and will not be described in detail. Reference may be made to U.S. Pat. application, Ser. No. 889,435, filed Dec. 31, 1969, entitled "Auxiliary Storage Apparatus," assigned to the assignee of this invention, for further information concerning FET drums.

Figure 2:
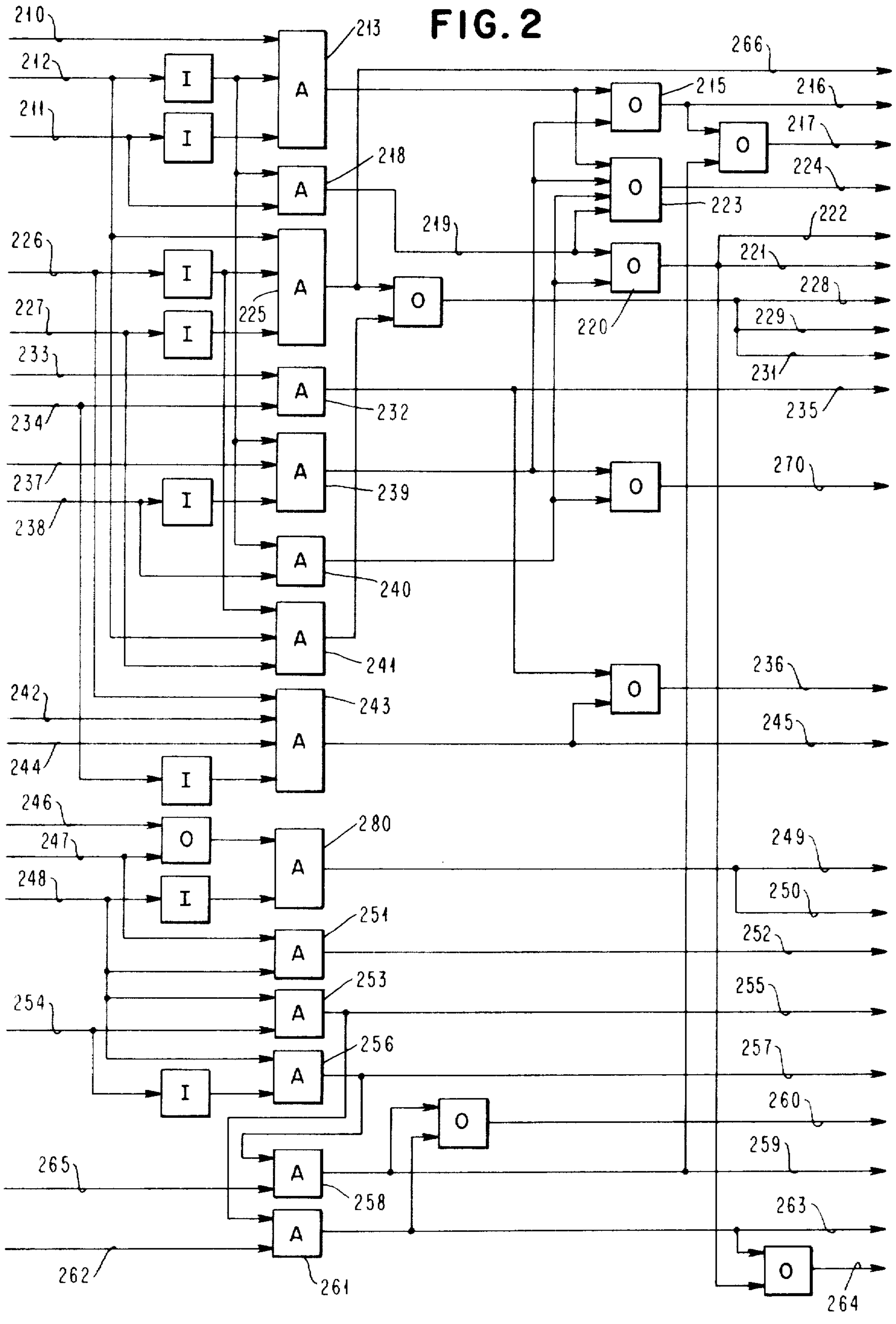
FIG. 2 illustrates logic circuits necessary to drive the overdue event detector.

The preferred embodiment of the invention illustrated in FIG. 1 shows where an input register (I reg) 10 receives information through transfer gates 11 from either a hardware interface 12 or a software interface 13 over bidirectional data busses. Logic circuits controlling the operation of the transfer gate 11 as well as performing all other control functions in the invention are shown in block form at 14 and **14*a* and labelled OED control. The specific circuitry involved in the OED control is shown in FIG. 2 and will be described hereinafter. In I reg 10, note that the event ID information plus the hardware and sequence bit data (H and S bits) are connected through transfer gates 15 to corresponding fields in the write register (W reg) 16. The delta time field of the I register is transferred to adder 17 where the addition of delta time and the instantaneous clock time may be accomplished and fed into the time field of W reg 16. At an appropriate time, information in the W reg is sent through transfer gates 18 into storage media 19. In the particular implementation shown in FIG. 1, storage media 19 is an FET drum (illustrated in schematic form) with a succession of slots provided along the surface of the drum. A write station 20 on the drum is shown connected to transfer gates 18 while a read station 21 is shown connected to a comparator 22. The drum 19 is periodically stepped so that at any given instant of time, a slot of information is located at read station 21 for the transfer of time information to comparator 22 where it is compared against actual clock time from clock 23. Correspondingly, event ID and H bit information are compared for purposes to be described hereinafter. Transfer gates 24 are connected to send detected overdue events from the comparator to the event register (E reg) 25 and finally, transfer gates 26** are provided to send the overdue information back to hardware or software requestors.

Figure 3:
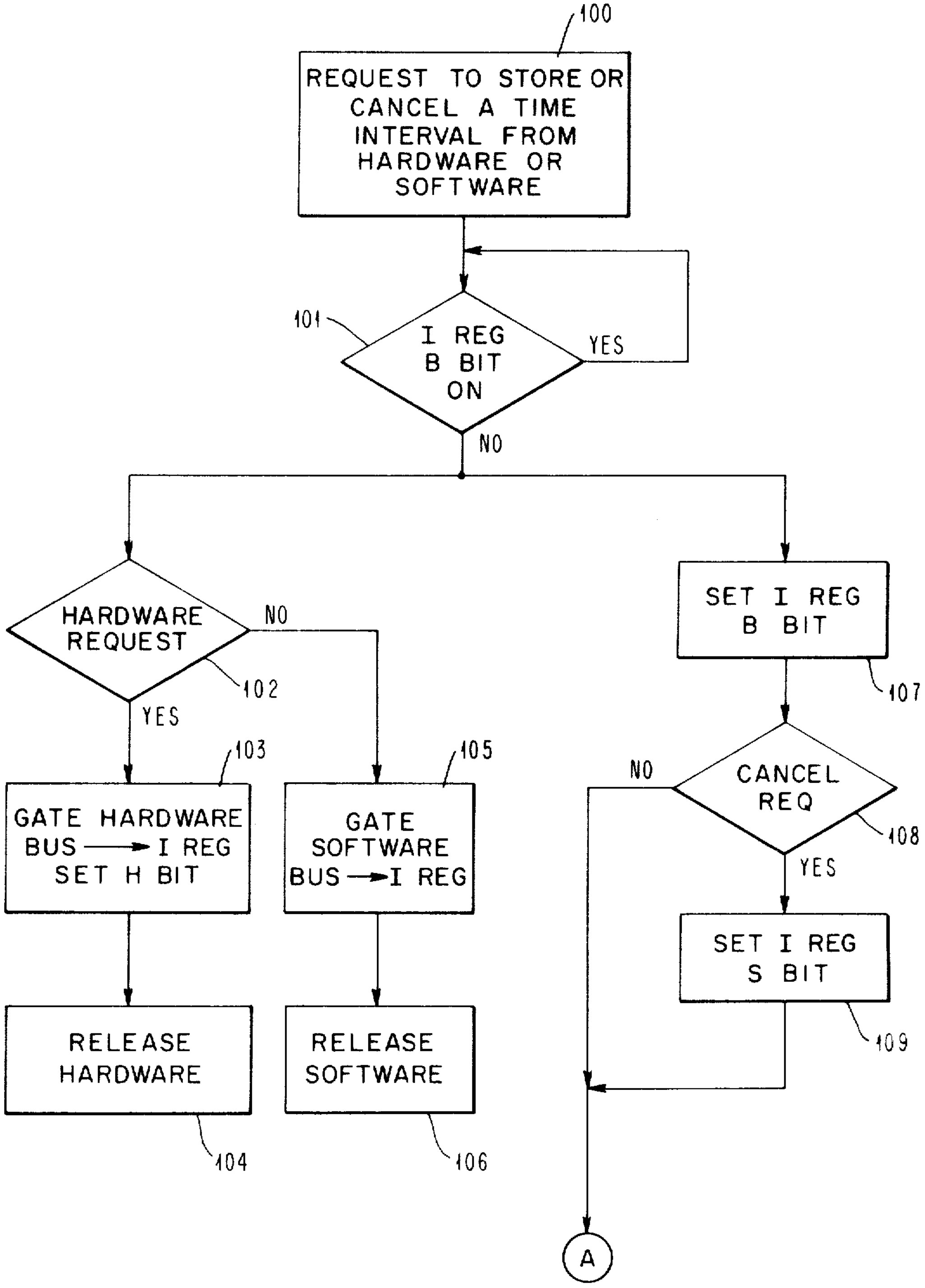
FIGS. 3 – 7 are logic flowcharts illustrating the sequential operation of the detector in performing the various functions it provides.
Figure 4:
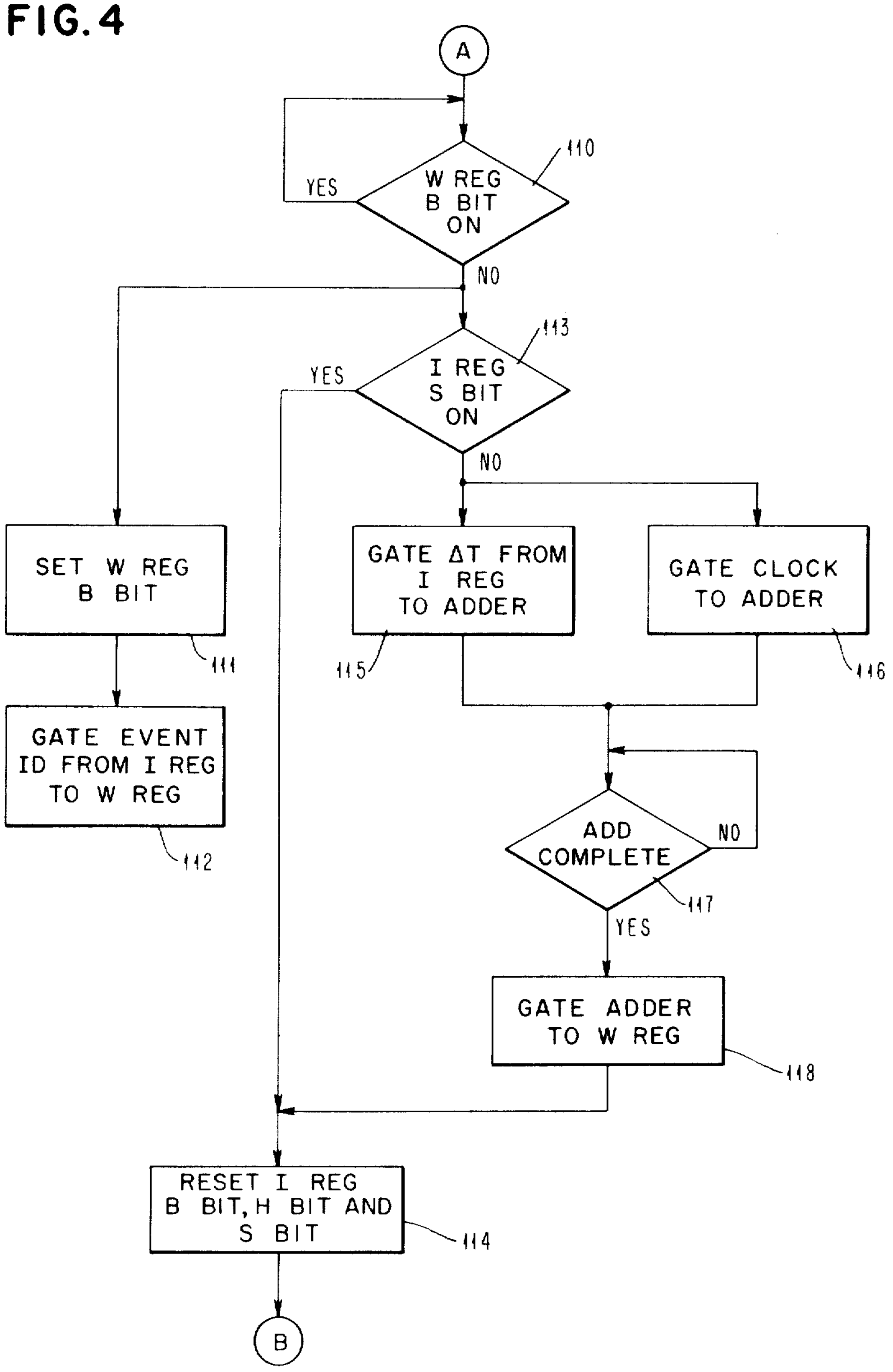
Figure 5:
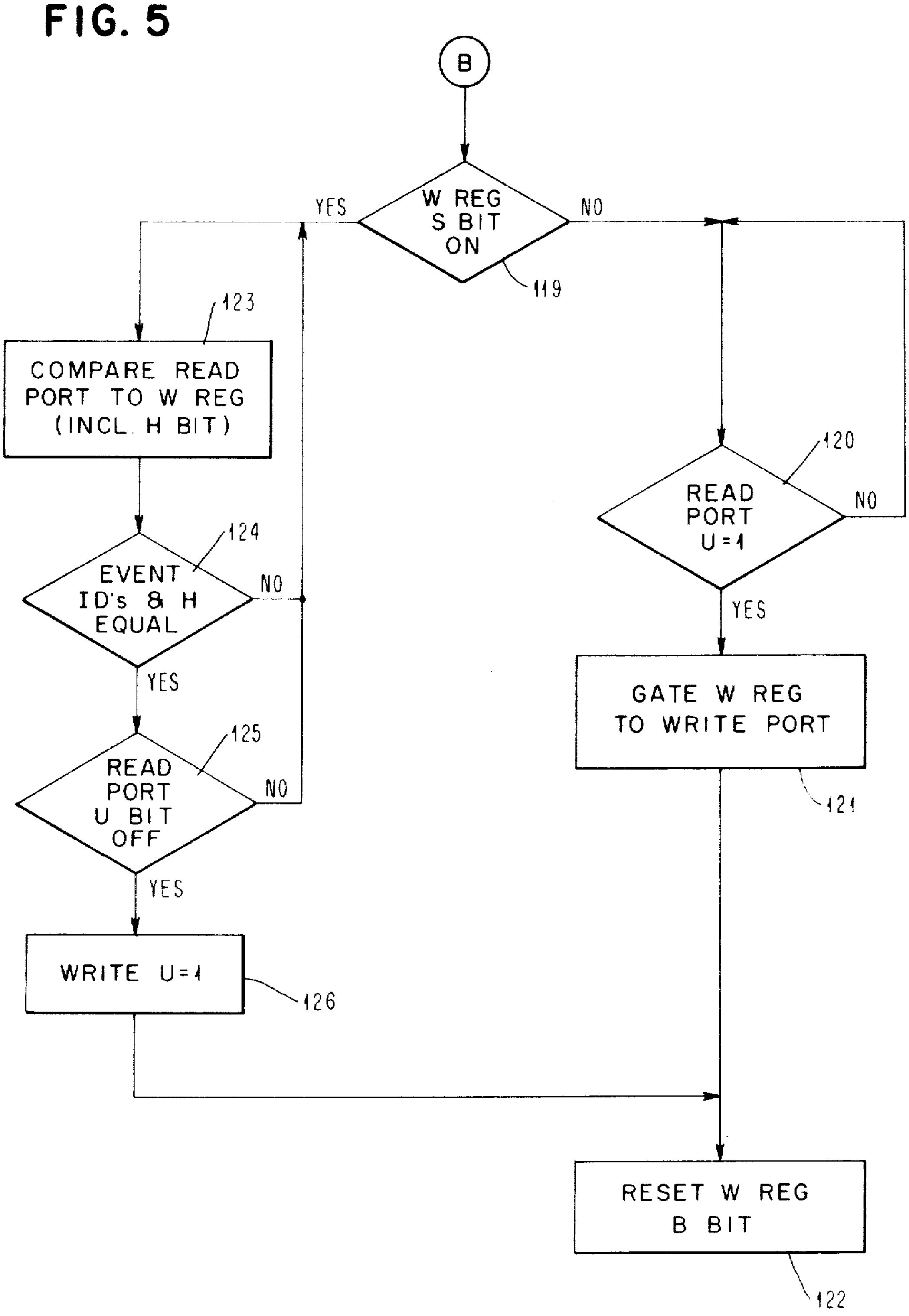

A detailed description of the storing of events on drum 19 and cancellation therefrom will now be set forth with respect to the logic flowcharts shown in FIGS. 3 through 5, in conjunction with FIG. 1. As shown in FIG. 3 at block 100, initially a request is received over the hardware or software interface to either store a time interval for a particular event in the detector or to cancel that information for a previously stored event since the event has already occurred without becoming overdue. When such a request is received, the first step is to query the I reg busy bit (B bit) to ascertain the status of the I reg. If the busy bit is off indicating that the I reg is available, OED control will ascertain whether the request was from hardware or software as shown at 102. If the request is from hardware, the hardware bus is gated into the I register, the hardware bit (H bit) of the I register is set as shown at 103, and the hardware requestor is released. Had the request been from software, the I register would have been gated to the software bus, the H bit would have been cleared, and software would have been released as shown at 105 and 106. Simultaneously with these actions, OED control would set the I register busy bit at 107 and would note whether the request was for a cancel operation or a store operation at 108. If a cancel operation is indicated, the I register sequence bit (S bit) is set on as shown at 109.

At this point in the operation, the incoming request has been logged into the I reg with the appropriate information being stored in the H bit, S bit and B bit by OED control thus indicating that the request is cancel or store, hardware or software, and that the I register is now busy. The operation continues as shown on FIG. 4 with the write register (W reg) busy bit being queried at 110 to ascertain the availability of W reg 16. If the register is available, the W reg busy bit is set and the event ID plus H and S bits are gated through transfer gates 15 from the I reg to the W reg as shown at 111 and 112. Next, the I register S bit is queried as shown at 113 to ascertain whether a cancel operation is indicated. If it is, the I register busy bit, H bit and S bit are reset at 114 and the operation continues; however, if a store operation is indicated, the designated time interval is gated from the I register to the adder at 115, the clock time is gated to the adder at 116, the two are added as shown at 117 and when complete, the result is gated to the W register time field at 118. If this sequence had been followed, the I register busy bit, H bit and S bit will now be reset and the operation will continue as shown on FIG. 5.

At this point the query is again made to determine whether the request is a store or cancel as shown at 119. If the request is to store the information now contained in the W register, OED control will proceed to query the read port U bit to ascertain whether the particular storage slot of drum 19 then appearing at read port 21 is usable or not. When a usable slot is found and when it is stepped to write position 20, the W register information will be gated to the write port and written on the FET drum as shown at 121. The W register busy bit will then be reset as shown.

Had the request been identified as a cancel request, the information in the FET drum slot at read port 21 would be compared to the W reg information as shown at 123. Drum 19 would be stepped until the corresponding event ID field and H bit information is found at 124, after which the read station U bit is tested at 125 to make sure it is off. This last insures against identical event ID and H bit information from two previous storage requests creating an error. The cancellation request is honored when the U bit for the slot is found off at 125 and changed to on at 126 thus indicating to OED control in subsequent operations that the slot is usable.

Figure 6:
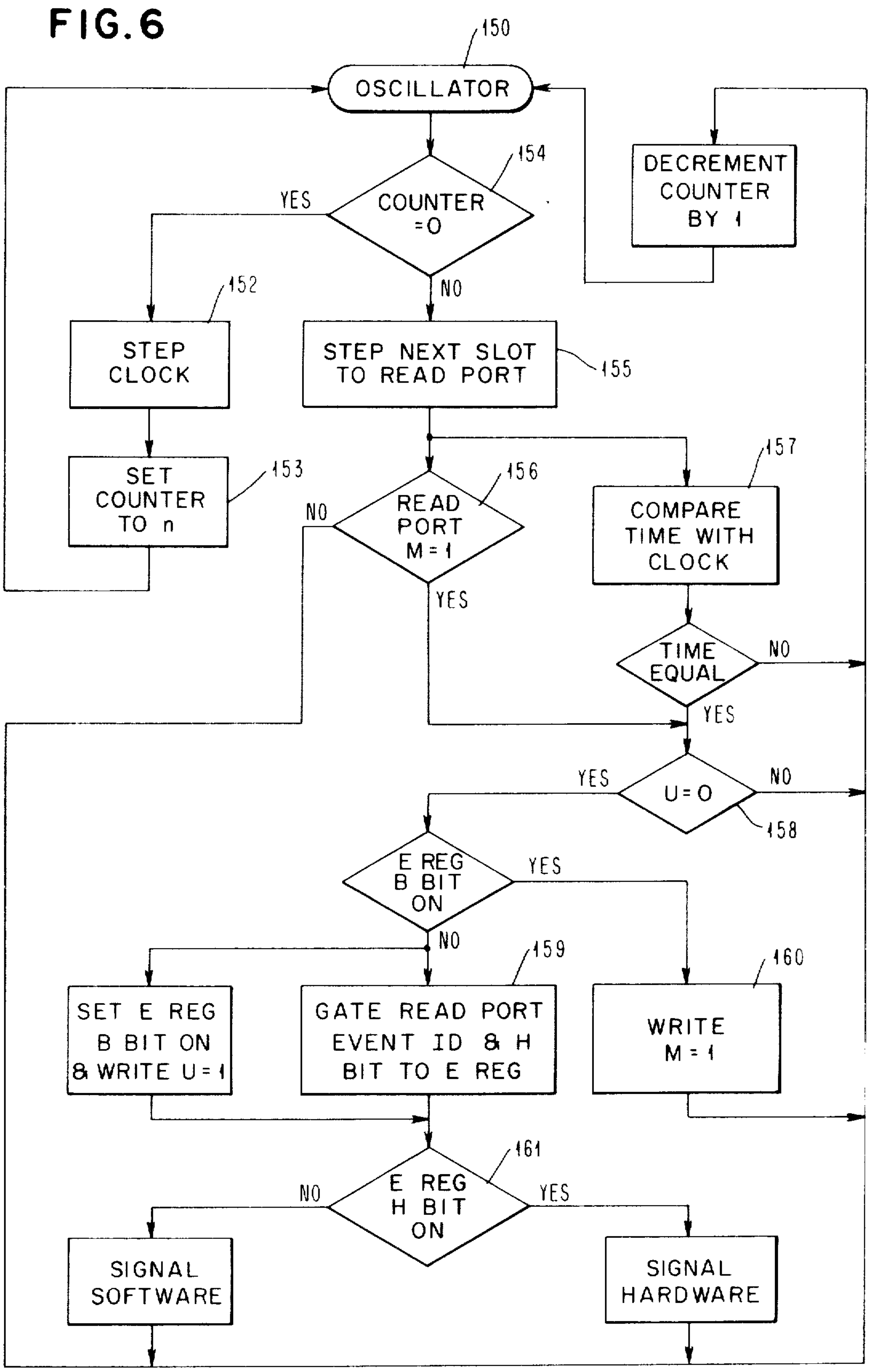

A description will now be given of the logical operation of the device in locating overdue events logged onto drum 19 and making them available to hardware or software. The logic flowchart is shown in FIG. 6 and logic circuitry is shown on FIGS. 8 and 9. Pulse generator 150 is part of the OED control and provides pulses to a counter 151 (FIG. 8) which contains as a maximum count the number of slots in electronic drum 19. For each pulse, OED control ascertains whether the count is equal to zero and if it is, the clock is stepped and the counter is set to the maximum number of slots in the FET drum. These operations are shown at 152 and 153. On the next pulse the query of the counter will indicate that it is now not equal to zero, consequently, the FET drum will be stepped one slot to provide new information under the read port. The time field of that slot is compared with clock time at 157 and if the times are equal, an overdue event has been detected as long as the U bit at 158 shows that the slot was actually in use. Next, the Event register (E reg) busy bit is queried and if it indicates that E register 25 is free, the overdue event ID and H bit will be gated to the E register at 159. If the overdue event was hardware, then hardware will be signalled as to the presence of an overdue event in the E register. If the event is software, then software will be signalled. In the case that the E register busy bit was on, the match bit (M bit) for that slot will be written to one at 160 and at the next time the slot appears at the read port, the fact of the M bit equalling one will be ascertained as shown at 156. This information indicates to OED control that an overdue event had been previously detected but had not been written into E register 25 for transfer back to hardware or software because the register had been busy at that time. Query will immediately be made as to the condition of the read station U bit and the B bit in the E register to determine if the E register is now available for gating the information in the read port to the event register. With the overdue event in E reg 25, a signal is sent to hardware or software, as indicated at 161, and the device waits for a request to be read out.

Figure 7:
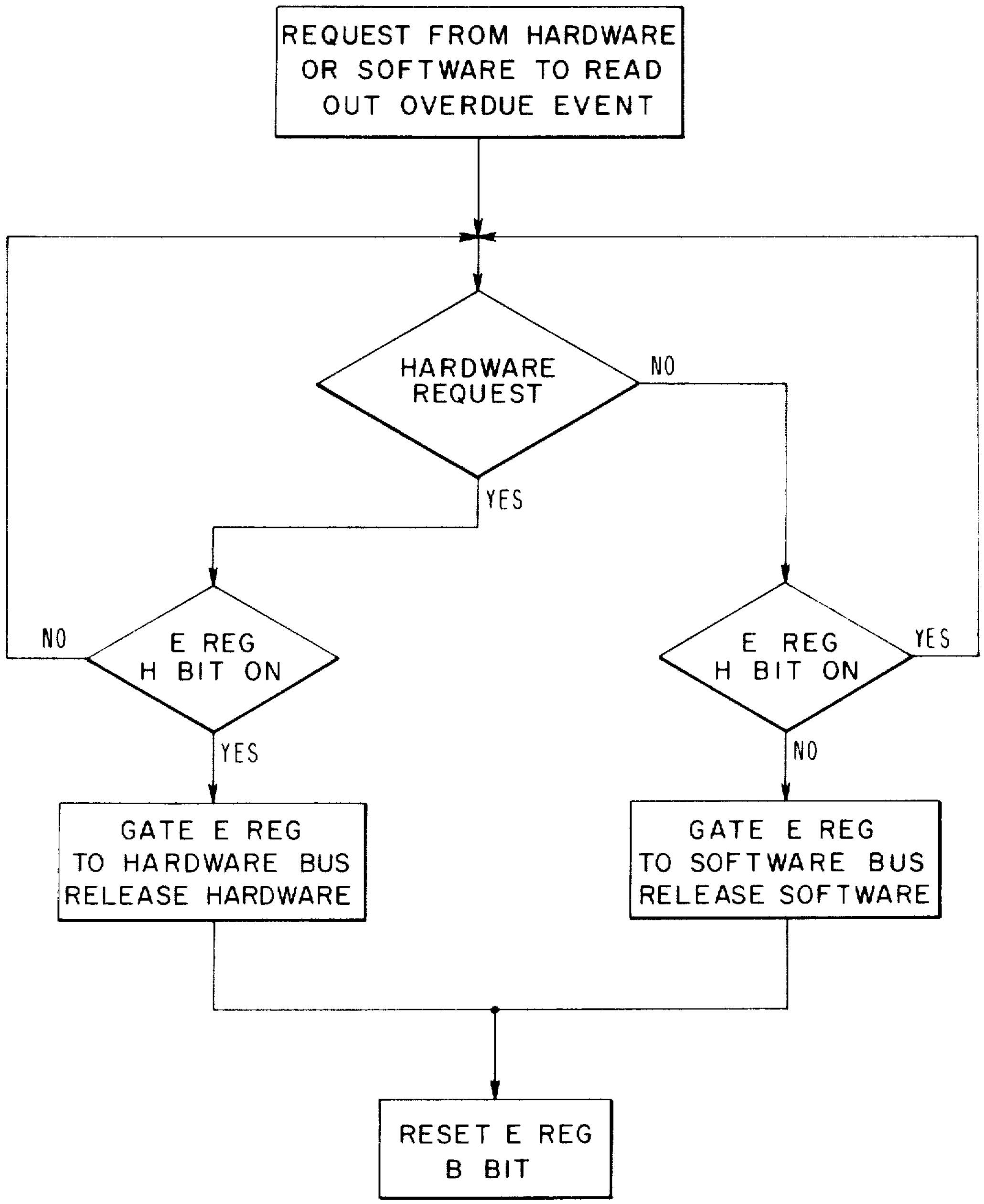

Reading the overdue event out to a requestor, hardware or software, is illustrated in logic flowchart form in FIG. 7 and is self-explanatory. The logic circuits are included in OED control and will be described below in reference to FIG. 2.

Figure 8:
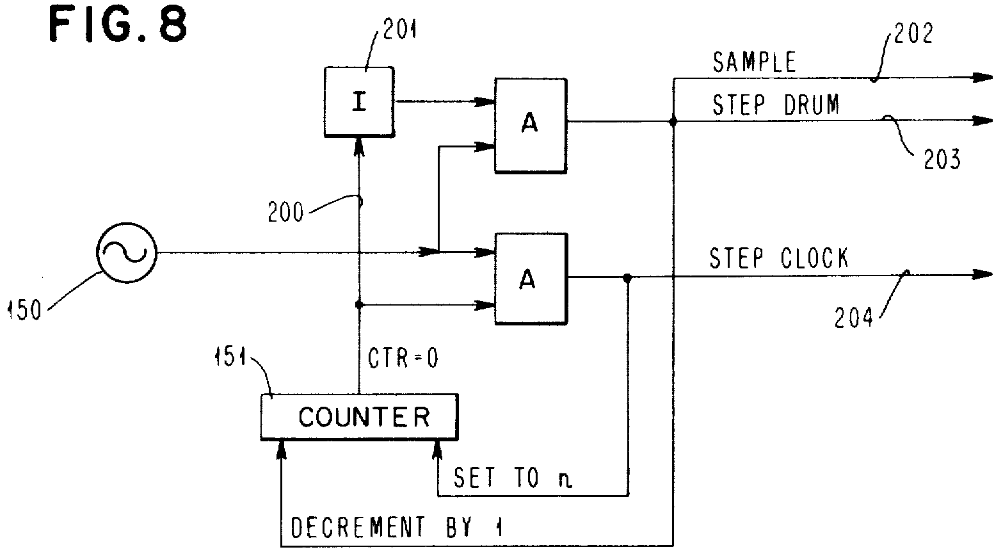
FIG. 8 shows logic circuitry connected with the pulse generator.
Figure 9:
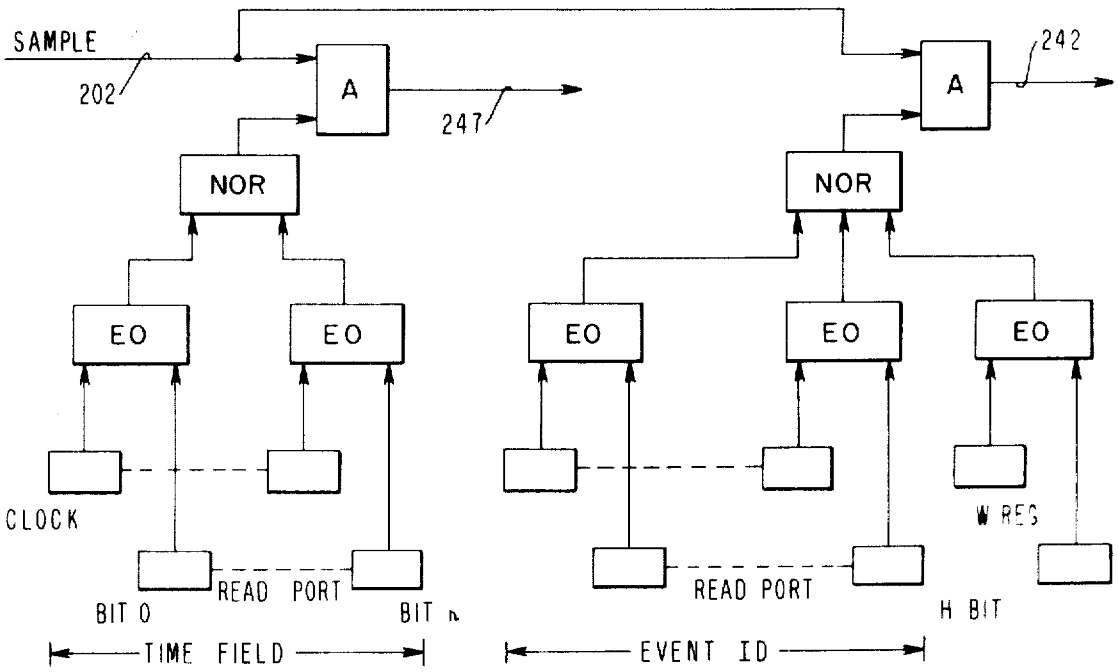
FIG. 9 provides an illustrative comparator which can be used with the device in the preferred embodiment described.

The actual logic circuits which can be utilized in the OED control to perform the logic functions described with respect to the various logic flowhcarts are shown in a preferred embodiment form in FIGS. 2, 8 and 9. FIG. 8 has been referred to previously and shows the pulse generator 150 supplying periodic pulses to step the clock, step the drum, and sample the information presently in the read port 21 of the FET drum 19 through use of the comparator 22. It should be noted that line 200 in FIG. 8 is on only when the count in counter 151 is equal to zero and that the clock 23 will be stepped at that time over line 204 whereas drum 19 and the comparison (sample) operation will be skipped because of the inversion shown at 201. Note also that each pulse which steps the clock will also reset the counter to its maximum value *n* while all other pulses decrement the counter by one.

Logic controlling the comparator circuit is shown in FIG. 9 with the triggering pulse received from the pulse generator at line 202. The time field under the read port at the moment of sampling pulse reception is compared to the clock and if a match is found, a pulse is provided for indicating that an overdue event has been detected through line 247 to appropriate handlers in OED control, FIG. 2. The remainder of the comparator circuit is for use by the cancellation operation and involves the comparison of the event ID field and H bit of the slot under the read port with the event ID field and H bit in the W reg in order to detect a cancellation match. When a match is found, a pulse is provided on line 242 to appropriate handlers in OED control, FIG. 2, described below.

In FIG. 2, incoming line 210 carries requests from software to store an event and incoming line 211 carries similar requests from hardware. In either case, the line will remain up until the I register busy bit is off indicating that the input register is available. I reg B bit information enters OED control through line 212. If the software request line 210 is up while lines 211 and 212 are down, AND circuit 213 will be satisfied thus providing an output pulse along line 214 through OR circuit 215 to provide a gating pulse over line 216 to gate the software bus to the I register. At the same time or with appropriate delay, a pulse is provided over line 217 to release the software request. If line 211 is up with the line 212 down, AND circuit 218 is satisfied providing an output pulse over line 219 through exclusive OR circuit 220 to provide a pulse gating the hardware bus to the I register over line 221 and providing a pulse over line 222 to release the hardware request.

It may be noted at this point that if lines 210 and 211 are simultaneously up, the hardware request will take precedence through AND circuit 218 since it is assumed that hardware operations are normally carried out in less time than software.

As noted in regard to the description of the logic flowcharts, it is necessary to set the I register busy bit whenever information is gated into the I register from either the hardware or software bus. Consequently, lines 214 and 219 are connected into OR circuit 223 which provides an output over line 224 to set the I register busy bit.

With line 224 up, line 212 will also be up thus providing one input to AND circuit 225. Line 226 represents the W register busy bit and if the W reg is available, the line will be down. Line 227 represents the I register sequence bit and will be off for a store event. These conditions satisfy AND circuit 225 creating an output over line 266 to gate clock time to the adder, over line 228 to gate the I register delta time to the adder and I reg event ID, H and S bit to the W register, over line 229 to set the W register B bit on, and over line 231 to clear the I register B bit H bit and S bit. Incoming line 233 is energized when the addition is complete in the adder and transferred to the W reg while line 234 is energized when the read port use bit is up thus indicating that the slot is available. These conditions satisfy AND circuit 232 providing an output over line 235 to transfer the information in the W register to the write port, and also provides an output over line 236 to clear the W register busy bit.

Thus far, in FIG. 2, the description has been directed toward the sequence of operations which have occurred in OED control for storing a hardware or software event in the FET drum. Next, the processing of cancellation requests is discussed and begins with a software request to cancel an event being received on incoming line 237, or with a similar hardware request being received on line 238. Assuming that the request is from software, AND circuit 239 will be satisfied as long as I reg is free and if there is no hardware cancellation request occurring at that time. When circuit 239 is satisfied, an output pulse is provided to set the I register sequence bit over line 240.

If the incoming request to cancel an event is a hardware request and if the I register is available, AND circuit 240 will be satisfied to provide a setting of the S bit over line 270 as well as setting the I register busy bit and H bit. Next, the AND circuit 241 will be satisfied when the W register busy bit indicates that the W reg is empty, the I register busy bit indicates the I reg is filled and the I register S bit indicates that a cancellation operation is being processed. With those conditions, an output will be provided to lines 228, 229 and 231 to transfer I register information to the W register, set the W register busy bit and clear the I register busy bit, H bit and S bit.

If the event is a cancellation request, the W register sequence bit will be set equal to one, hence incoming line 242 will be up. If line 226 representing the W register busy bit is on, and if line 234 representing the read port use bit is up, and if line 244 representing the information that the event ID and H bit of the slot at the read port are equal to the event ID and H bit presently in the write register, all inputs to circuit 243 will be satisfied. Thus, an output is provided over line 245 to set the U bit of that slot equal to one and to clear the W register busy bit over line 236. In that manner, the cancellation request is honored.

Incoming line 246 represents match bit information at the read port and if it is on, it indicates that the M bit has been set on some previous compare. Incoming line 247 indicates that clock time equals the time field of the slot at the read port. If either line 246 or 247 is satisfied, together with a pulse over line 248 indicating that the E register is available, circuit 280 is satisfied. Thus an output is provided over line 249 to transfer the event ID to the E register and is also provided over line 250 to set the E register busy bit.

Circuit 251 is satisfied if the time field and clock times are equal and if the event register is not available. If those two conditions are satisfied, output is provided over line 252 to set the M bit equal to one. Thus an overdue event is indicated and stored for a future transfer to the E reg.

Circuit 253 is satisfied if the event register is occupied and if the H bit in the E register is equal to one as indicated over line 254. With those conditions met, output is provided over line 255 to signal hardware that an overdue event has been detected and is in the E reg.

Circuit 256 is satisfied if the event register hardware bit is off and if the event register busy bit is on. If that condition is present, an output is provided over line 257 to signal software that an overdue event has been detected and is in the E reg.

Circuit 258 is satisfied if a software event has been detected and a request is received from software to read that information out. When those conditions occur, output is provided over line 259 to gate the event register to the software bus in order to send a release to software and over line 260 to clear the E register busy bit.

Circuit 261 is satisfied if the overdue event detected is a hardware event and when a request is received from hardware over line 262 to read it out. When those conditions are satisfied, an output is provided over line 263 to gate the event register to the hardware bus and also to clear the E register busy bit and send a release to hardware over line 264.

Throughout the description, it is evident that appropriate delays will necessarily be built into the various circuits so that sequential logic flows in the described manner. Such delays, and to some extent the location of special delay circuits, depend upon the parameters of those components chosen to implement the invention and therefore have not been shown in the drawings or included in the description.

While the invention has been shown and described with reference to a particular embodiment, it will be understood that various alternatives exist which can be used without departing from the spirit and scope of the invention. For example, associative memories can be used instead of an FET drum and, indeed, might be desirable for applications in which large quantities of events are expected to be stored. Various tradeoffs are possible in regard to the resolution of the detector, its capacity, and the cost of its manufacture, and all changes in form and detail therein may be made without departing from the spirit and scope of invention.

What is claimed is:

1. In a computing system including hardware and software components and which is typically utilized by application-oriented programs, apparatus for detecting events which have become overdue during machine operation comprising means for simultaneously storing a plurality of events which are to be detected in case they are not completed by a designated time, means for calculating an appropriate designated time for each logged event and for storing said time with its associated event on said storage means, comparator means for comparing said designated time with clock time to ascertain overdue events, and means for providing an alerting signal to the event source whereby hardware and software components associated with the machine and its utilization are afforded an indication when logged events have not occurred within a designated time interval.

2. The apparatus of claim 1 further including means for cancelling logged events when they occur prior to the designated time.

3. The apparatus of claim 2 further including buffer means to receive requests for logging or cancelling events and for transmitting said events to said storage means, and buffer means to receive detected overdue events from said storage means and transmitting said overdue events to requestors.

4. The apparatus of claim 3 wherein said means for calculating designated times includes a time-of-day clock and an adder for summing instantaneous time and a time interval supplied by a requestor in order to calculate a further designated time by which the associated event must have occurred.

5. An overdue event detector including storage means for use with computing equipment comprising buffer register means for reception of data in binary digit form from either hardware or software sources, wherein each of said data includes event identifiers and, if the received data is to be stored on said storage means, also includes a time interval during which the identified event is expected to occur, clock means for recording the time-of-day, means for adding time-of-day and said received time interval, means for controlling the transmittal of said received event data to be stored from said buffer means to said storage means at locations in storage available for use, and for controlling the transmittal of said time intervals and instantaneous clock times from said buffer and said clock respectively to said adding means where future times are calculated, and for controlling the transmittal of said future times to said storage means at said available location means for testing said stored future times against actual time in order to detect passage of said received time intervals and for alerting hardware or software sources of events.

6. The machine-implemented method of detecting overdue events in hardware and software components of computing systems through the use of special overdue event detecting equipment comprising the steps of providing separate hardware and software interface connections from said computing system to said special event detecting equipment, receiving event identifying information in binary digit form through one of said interfaces identifying said received information as a request to store the event in said detector or to cancel it from storage in said detector if said request is to store the event, receiving time interval information with said event identifying information over said interface, calculating a future time from use of said interval, and storing said event and future time in said special detecting equipment if said request is to cancel an event from storage, setting a bit to indicate the availability of the location at which the event is stored in said special detecting equipment, comparing said stored future times with actual time in order to detect passage of said received time intervals, and upon detecting passage of a time interval, alerting hardware or software as appropriate of the detected overdue event by signalling over one of the said interfaces to said computing system.

* * * * *